United States Patent
Kok et al.

(10) Patent No.: US 9,824,080 B2
(45) Date of Patent: Nov. 21, 2017

(54) AUTOMATIC GENERATION OF FORMS FOR DEVICE CONFIGURATION

(71) Applicant: Aruba Networks, Inc., Sunnyvale, CA (US)

(72) Inventors: Choh Mun Kok, San Jose, CA (US); Ravi Mehra, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 299 days.

(21) Appl. No.: 14/170,346

(22) Filed: Jan. 31, 2014

(65) Prior Publication Data
US 2015/0220233 A1   Aug. 6, 2015

(51) Int. Cl.
| | |
|---|---|
| G06F 17/00 | (2006.01) |
| G06F 17/24 | (2006.01) |
| G06F 3/06 | (2006.01) |
| G06F 9/44 | (2006.01) |
| H04L 12/24 | (2006.01) |

(52) U.S. Cl.
CPC .......... G06F 17/243 (2013.01); G06F 3/0605 (2013.01); G06F 9/4411 (2013.01); H04L 41/0803 (2013.01)

(58) Field of Classification Search
CPC .. G06F 17/243; G06F 3/0484; G06F 9/44505; G06F 3/0605; G06F 9/4411; H04L 67/02; H04L 41/0803
See application file for complete search history.

(56) References Cited

U.S. PATENT DOCUMENTS

| | | | | |
|---|---|---|---|---|
| 6,314,415 B1* | 11/2001 | Mukherjee | ............ | G06F 9/4443 706/45 |
| 6,574,791 B1* | 6/2003 | Gauthier | ............... | G06F 9/4446 717/107 |
| 7,219,339 B1* | 5/2007 | Goyal | .................. | H04L 41/085 717/141 |
| 7,509,400 B1* | 3/2009 | Tanner | .................. | G06F 13/387 370/352 |
| 7,941,786 B2* | 5/2011 | Scott | .................... | H04N 5/4403 707/770 |
| 8,127,224 B2* | 2/2012 | Vincent, III | ........ | G06F 17/2247 715/221 |
| 8,261,184 B2* | 9/2012 | Haase | ...................... | B42D 9/00 715/230 |
| 8,756,489 B2* | 6/2014 | Richardt | ............... | G06F 17/217 715/221 |
| 8,977,951 B2* | 3/2015 | Ethier | ................... | G06F 3/0484 715/222 |

(Continued)

Primary Examiner — Cesar Paula
Assistant Examiner — James H Blackwell
(74) Attorney, Agent, or Firm — Hewlett Packard Enterprise Patent Department

(57) ABSTRACT

The present disclosure discloses a method and network device for automatic generation of forms for device configurations. Specifically, a network device receives a static configuration document from a user. The network device waits for a content creator to parse through the configuration document and tag various dynamic fields with supported dynamic content tags. The network device can then extract the dynamic variables from the processed document and generate forms to present to the user for the requested information. Next, the network device generates static configuration file(s) corresponding to one or more devices for the user based on the user input values.

20 Claims, 6 Drawing Sheets

(56) References Cited

U.S. PATENT DOCUMENTS

| | | | |
|---|---|---|---|
| 9,009,585 B1* | 4/2015 | Chetrit | G06F 9/24 715/221 |
| 9,063,921 B1* | 6/2015 | Cogan | G06F 17/248 |
| 2002/0078103 A1* | 6/2002 | Gorman | G06F 8/34 715/234 |
| 2002/0129004 A1* | 9/2002 | Bassett | G06Q 30/02 |
| 2002/0174209 A1* | 11/2002 | Sesek | H04L 29/06 709/223 |
| 2003/0069947 A1* | 4/2003 | Lipinski | H04L 29/06 709/220 |
| 2003/0074636 A1* | 4/2003 | Manepalli | G06F 17/243 715/234 |
| 2004/0039991 A1* | 2/2004 | Hopkins | G06F 17/243 715/224 |
| 2004/0133689 A1* | 7/2004 | Vasisht | H04W 28/18 709/228 |
| 2004/0133888 A1* | 7/2004 | Ard | G06F 8/61 717/174 |
| 2004/0143830 A1* | 7/2004 | Gupton | G06F 8/61 717/174 |
| 2004/0205529 A1* | 10/2004 | Poulose | G06F 17/243 715/205 |
| 2004/0255243 A1* | 12/2004 | Vincent, III | G06F 17/2247 713/170 |
| 2006/0098685 A1* | 5/2006 | Mase | H04L 67/36 370/467 |
| 2006/0143146 A1* | 6/2006 | Bognar | G06F 9/44505 |
| 2006/0143572 A1* | 6/2006 | Scott | H04N 5/4403 715/765 |
| 2007/0250783 A1* | 10/2007 | Wu | G06F 17/243 715/762 |
| 2008/0098291 A1* | 4/2008 | Bradley | G06F 17/243 715/223 |
| 2008/0120557 A1* | 5/2008 | Offenhartz | G06F 8/38 715/760 |
| 2009/0150773 A1* | 6/2009 | Falkner | G06F 9/44505 715/700 |
| 2009/0177961 A1* | 7/2009 | Fortini | G06F 17/2247 715/239 |
| 2010/0064763 A1* | 3/2010 | Gaikwad | H04L 12/2697 73/1.01 |
| 2010/0070945 A1* | 3/2010 | Tattrie | G06F 8/20 717/101 |
| 2012/0159300 A1* | 6/2012 | Vincent, III | G06F 17/2247 715/222 |
| 2013/0198628 A1* | 8/2013 | Ethier | G06F 3/0484 715/709 |
| 2014/0033010 A1* | 1/2014 | Richardt | G06F 17/217 715/222 |

* cited by examiner

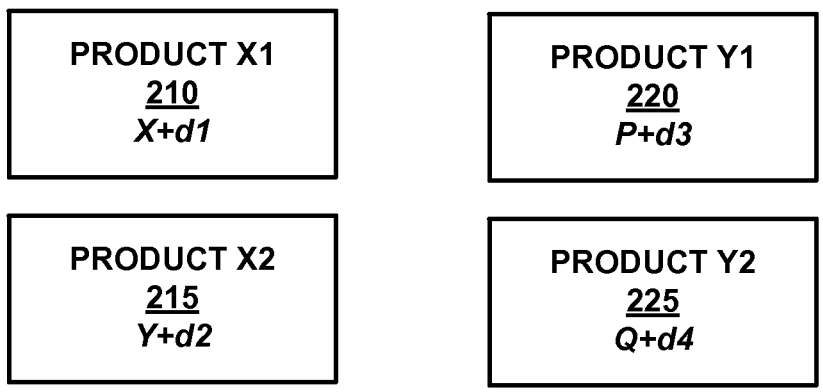
FIG. 2A
| QUESTION PROMPTS 230 | USER INPUTS 240 |
|---|---|
| Q1 | d1 |
| Q2 | d2 |
| Q3 | d3 |
| Q4 | d4 |
FIG. 2B
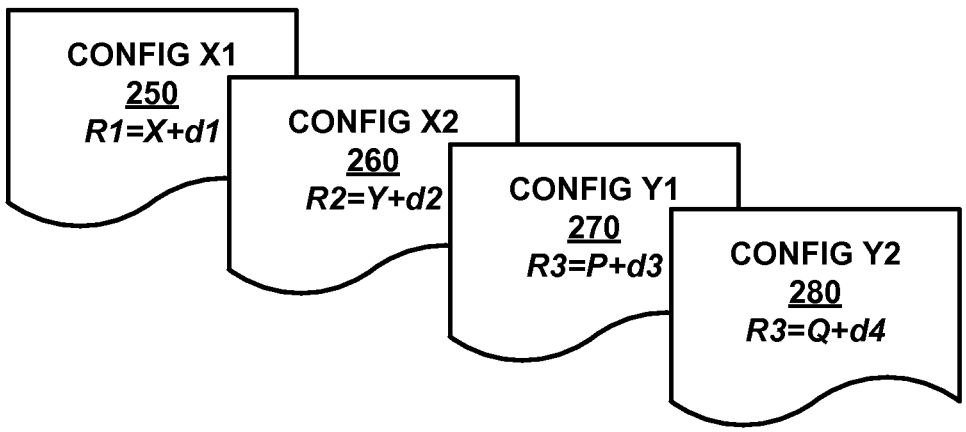
FIG. 2C

US 9,824,080 B2

AUTOMATIC GENERATION OF FORMS FOR DEVICE CONFIGURATION

FIELD

The present disclosure relates to dynamic device configuration in an enterprise local area network. In particular, the present disclosure relates to automatic generation of forms for device configurations in enterprise local area networks.

BACKGROUND

Today's enterprise local area networks (LANs), however, are usually provided by multiple network device vendors. Each vendor has its own way of configuring its network devices. For example, each vendor typically provides its own set of command-line interface (CLI) commands, graphic user interface (GUI), etc. This increases the burden of IT professionals in the enterprise due to the specialized knowledge required for configuring network devices from different vendors. The enterprise LAN includes both wired networks and wireless networks, such as those in compliance with IEEE 802.11 standards.

Also, many vendors provide their own wizard for the network administrators to click through in order to configure a network device or product. The wizard interface varies greatly from vendor to vendor as well. Thus, network administrators must use different wizard to configure network devices and/or products from different network vendors. Moreover, the functional and the syntax differences among different network vendors make device configurations a difficult task. Even if the devices are configured the same way, because they are from different vendors, the manner they are configured can be drastically different.

BRIEF DESCRIPTION OF THE DRAWINGS

The present disclosure may be best understood by referring to the following description and accompanying drawings that are used to illustrate embodiments of the present disclosure.

FIGS. 2A-2C illustrates exemplary dynamic device configurations according to embodiments of the present disclosure.

DETAILED DESCRIPTION

In the following description, several specific details are presented to provide a thorough understanding. While the context of the disclosure is directed to device configurations in enterprise networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to device configuration in an enterprise local area network. In particular, the present disclosure relates to automatic generation of forms for device configurations in enterprise local area networks.

With the solution provided herein, the disclosed system obtains a first document comprising a plurality of variables. Also, the disclosed system traverses the first document to identify each of the plurality of variables. The disclosed system can optionally define an input format for each of the plurality of variables based on respective information associated with each of the plurality of variables. The disclosed system then generates code which, when executed, causes performance of a second set of operations for requesting a user input value for each of the plurality of variables. Finally, the disclosed system generates a second document based on (a) at least a portion of the static values in the first document and (b) the user input value for each of the plurality of variables Moreover, according to solution provided herein, the disclosed system displays a first user input field for obtaining a first user input, and receives the first user input from the user. Concurrently with receiving the first user input from the user, the disclosed system generates a device configuration for a device based on a template associated with the device and the first user input, and displays the device configuration for the device.

Vendor-Specific Network Device Configurations

Figure 1:
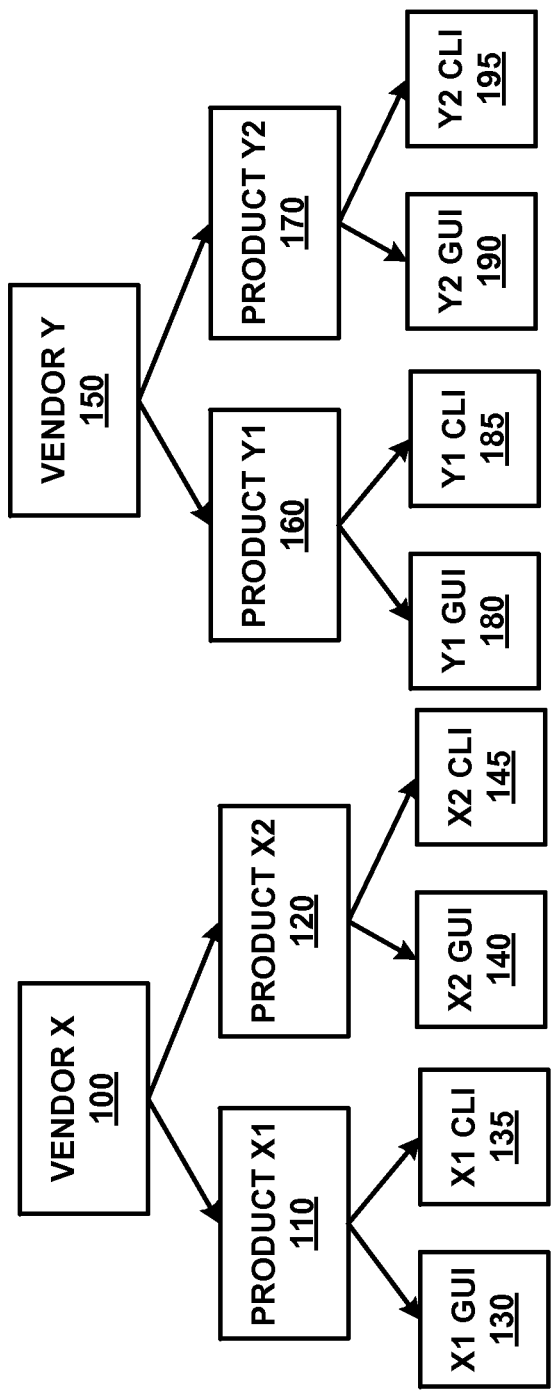
FIG. 1 shows exemplary vendor-specific network device configurations according to embodiments of the present disclosure.

FIG. 1 shows exemplary vendor-specific network device configurations according to embodiments of the present disclosure. For illustration purposes only, FIG. 1 includes two vendors, namely vendor X 100 and vendor Y 150. In this example, each vendor has two network products. Specifically, vendor X 100 sells product X1 110 and product X2 120. Likewise, vendor Y 150 sells product Y1 160 and product Y2 170. Each product is further provided with multiple ways of configuration. For instance, product X1 110 can be configured by X1 GUI 130 and/or X1 CLI 135; product X2 120 can be configured by X1 GUI 140 and/or X1 CLI 145; product Y1 160 can be configured by Y1 GUI 180 and/or Y1 CLI 185; product Y2 170 can be configured by Y2 GUI 190 and/or Y2 CLI 195; etc.

To modify the configuration of a generic network device, a network administrator needs to learn the configuration syntax of that product (e.g., product X1 110 or product Y1 160). This becomes increasingly difficult when various vendors release multiple products, each with their own command line interface (CLI) and graphical user interface (GUI). As illustrated in FIG. 1, the introduction of a new vendor into an existing network can exponentially increase the amount of command line and/or graphical user interfaces the administrator needs to learn.

Networks according to embodiments of the present disclosure may operate on a private network including one or more enterprise local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

The network device to be configured in accordance to FIG. 1 may include network control plane devices, such as network controllers, access points, switches, or routers, etc. Each network control plane device may be located in a separate sub-network. The network control plane device may manage one or more network management devices, such as access points or network servers, within the sub-network.

To reduce the complexity from vendor-specific network device configurations, embodiments of the present disclosure describe a network management system that assists configuring each device. The disclosed network management systems also place restrictions into which products and which versions of those products it can support. These restrictions are introduced due to the close relationship the network management system has between the CLI syntax and the features each CLI command targets. The same problem extends to Simple Network Management Protocol (SNMP)-based configuration.

Dynamic Device Configurations

FIGS. 2A-2C illustrates exemplary dynamic device configurations according to embodiments of the present disclosure. Specifically, FIG. 2A illustrates a number of network devices (products) to be configured. FIG. 2A includes product X1 210 (from vendor X 100), product X2 215 (from vendor X 100), product Y1 220 (from vendor Y 150), product Y2 225 (from vendor Y 150), etc.

According to embodiments of the present disclosure, the disclosed system receives a static configuration document form a user, which includes, but is not limited to, CLI keywords and CLI variables. Every configuration (CLI or GUI) can be broken down into a set of static information and a set of dynamic information. A network administrator needs to input the dynamic information in order to configure a network device. The disclosed system supports the ability to separate the static and dynamic content of a device's CLI/GUI configuration to loosely couple the CLI/GUI commands and the features they configure.

Further, the disclosed system provides a set of syntax by which a content creator can denote which portion of information in a configuration document is static, and/or which portion of information in the configuration document is dynamic. Thus, the disclosed system effectively abstracts all different device configuration commands from various vendors, and provides a device-independent syntax that a network administrator can easily comprehend and use for generating device-dependent and vendor-specific configurations.

For example, in the example illustrated in FIG. 2A, the network administrator (or content creator) denotes that the configuration for product X1 210 (e.g., X+d1) includes a static portion X and a dynamic portion d1; the configuration for product X2 215 (e.g., Y+d2) includes a static portion Y and a dynamic portion d2; the configuration for product Y1 220 (e.g., P+d3) includes a static portion P and a dynamic portion d3; the configuration for product Y2 225 (e.g., Q+d4) includes a static portion Q and a dynamic portion d4; etc.

Specifically, to make the separation between static portion and dynamic portion, a content creator can use the disclosed system to define a full set of working CLI configurations from any vendor, any product, and/or any version. The content creator then parameterizes the dynamic content in the CLI configuration using a template language. Examples of the dynamic content that can be parameterized include, but are not limited to, various profile names, Virtual Local Area Network (VLAN) interface names, network authentication server (e.g., Remote Authentication Dial In User Service (RADIUS) server) Internet Protocol (IP) addresses. In the following example, in a CLI configuration, the dynamic content can be surrounded by percent signs (%). The static content does not change from the original CLI configuration.

```
wlan auth-server "%gen_prefix%-%profile_name%"
    ip %authentication_server_host%
    port 1812
    acctport 1813
    key %radius_shared_secret%
    rfc3576
exit
```

Percent signs are merely one example of the template language. Other template language options exist to accomplish other dynamic configuration including conditional statements, groupings, hooks, etc. Dynamic content tags supported by the disclosed system are described in detail in the following section.

FIG. 2B illustrates exemplary prompts to network administrators and/or users for information according to embodiments of the present disclosure. After the content creator has parameterized the configuration to indicate the dynamic portion of the information, a user can begin building custom configuration with it. The disclosed system will parse the configuration template language and request information from the end-user to populate the dynamic configuration. For example, as illustrated in FIG. 2B, based on dynamic portions of information identified in FIG. 2A, the disclosed system generates question prompts 230, such as Q1, Q2, Q3, Q4, etc. When a user enters the requested information for the dynamic options as user inputs 240 (e.g., d1, d2, d3, d4, etc.), the configuration is updated in real-time.

After all dynamic information is entered, the resulting custom-built CLI configuration is ready to be applied on the desired network device as illustrated in FIG. 2C. FIG. 2C illustrates four configurations generated for the four different products illustrated in FIG. 2A. Specifically, Config X1 250 (R1) is generated for product X1 210 and includes a static portion X and user input d1 for the values of the dynamic portion. Likewise, Config X2 260 (R2) is generated for product X2 215 and includes a static portion Y and user input d2 for the values of the dynamic portion. Config Y1 270 (R3) is generated for product Y1 220 and includes a static portion P and user input d3 for the values of the dynamic portion. Config Y2 280 (R4) is generated for product Y2 225 and includes a static portion Q and user input d4 for the values of the dynamic portion.

In some embodiments, only one set of questions are prompted to the user, and the user input values are shared during the generation of configurations for two different devices (from same or different vendors). Although the user input values are shared and same, the syntaxes in the configurations for the different devices are different. Users are not required to have specialized knowledge about the syntaxes for the different device configurations. Thus, the user only needs to enter the requested input values once, and the disclosed system will generate multiple configurations for different devices at the same time based on the user input values.

In some embodiments, multiple sets of questions can be organized into different groups. Each group of questions can be presented in a separate tab in the user prompt window.

Figure 3:
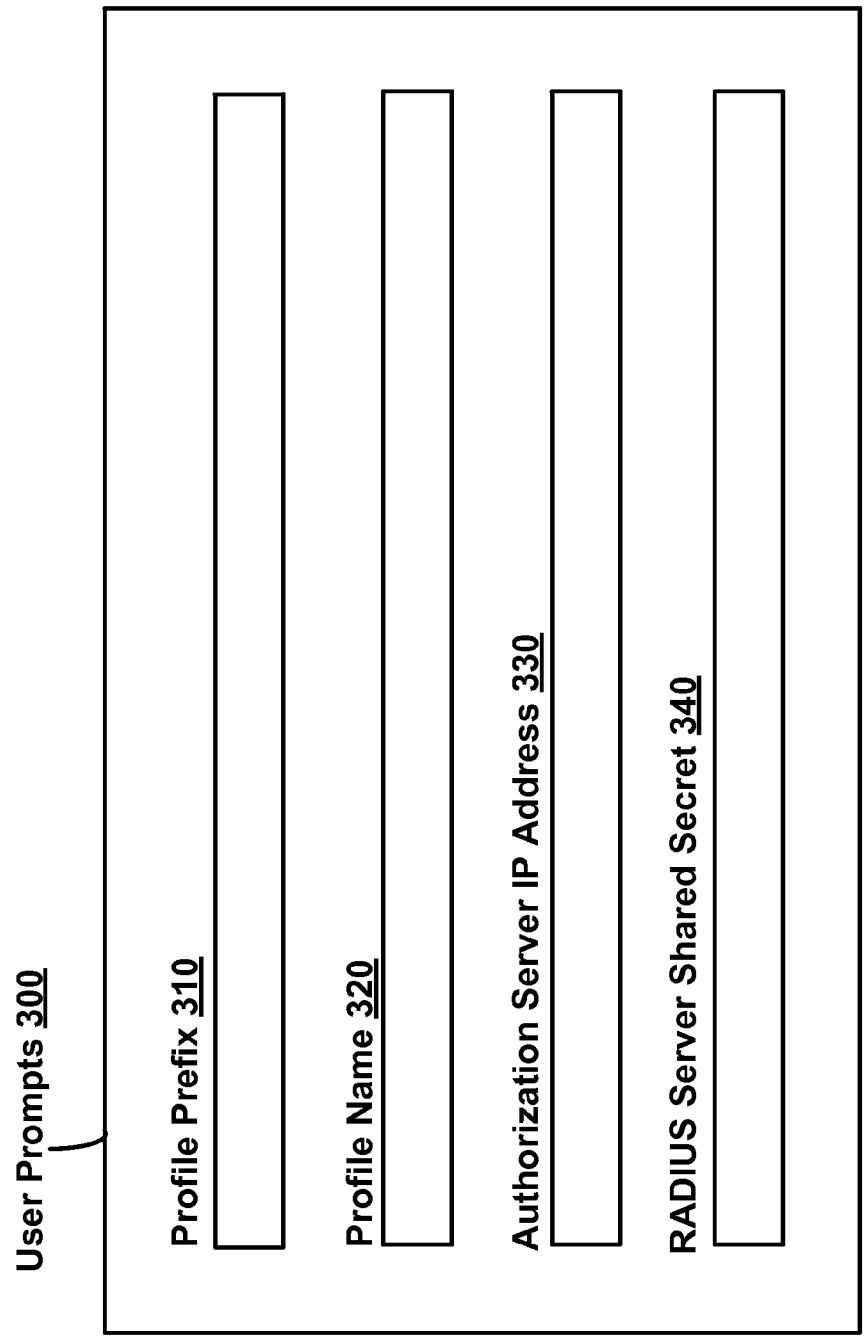
FIG. 3 illustrates an exemplary set of user prompts according to embodiments of the present disclosure.

FIG. 3 illustrates an exemplary set of user prompts 300 according to embodiments of the present disclosure. Specifically, user prompts 300 are presented to a user for entering information such as profile prefix 310, profile name 320, authorization server IP address 330, RADIUS server shared secret 340, etc. The received user inputs correspond to values of various dynamic fields. For example, user input value "tpi" to profile prefix 310 corresponds to %gen_prefix%; user input value "clearpass" to profile name 320 corresponds to %profile_name%; user input value "10.162.108.11" to authentication server IP address 330 corresponds to %authentication_server_host%; and user input value "aruba123" to RADIUS server shared secret 340 corresponds to %RADIUS_shared_secret% in the CLI configuration example described above.

Moreover, when a user enters the requested information for the dynamic portions of the configuration, the configuration is updated in real-time and can be presented to the user side by side to the user prompts in the same window view. For example, the following CLI configuration may be presented to the user (e.g., in the same window as illustrated in FIG. 3) upon the user entering the input values as described above.

```
wlan auth-server "tpi-clearpass"
    ip 10.162.108.11
    port 1812
    acctport 1813
    key aruba 123
    rfc3576
exit
```

Also, if the same dynamic variable appears multiple times in a configuration, the user is prompted only once. As soon as the user enters the input value for the dynamic variable, the value is reused by the multiple occurrences of the dynamic variable. Thus, each and every occurrence of the dynamic variable in the configuration will be updated with the user input value.

In some embodiments, as the user enters the answer to a question, the system displays in real-time the corresponding dynamic variable value change in a live view window, which shows the configuration file to be generated. For example, as the user enters the profile name "clearpass", the %profile_name% in the configuration file displayed in the live view window will be replaced with the value "clearpass." Thus, the live view window will be updated to display the following configuration.

```
wlan auth-server "%gen_prefix%-clearpass"
    ip %authentication_server_host%
    port 1812
    acctport 1813
    key %radius_shared_secret%
    rfc3576
exit
```

Once the configuration is generated, the disclosed system make a system call and automatically push the corresponding configuration to a respective device.

Dynamic Content Tags

At the backend, the disclosed system maintains a set of template language as well as a predefined set of field descriptions that map a dynamic field to a question and/or descriptor. The disclosed system can also analyze a received input configuration document, perform computations as needed, and derive new values.

Once the disclosed system receives a static configuration document from a user, the disclosed system waits for a content creator to parse through the document and tag various dynamic fields with supported dynamic content tags described below. The disclosed system can then extract the dynamic variables from the processed document and generate forms to present to the user for the requested information.

In an example, the pre-defined set of field descriptions may indicate that a profile name dynamic field can be derived from the value of another dynamic field, such as the ssid field. Thus, when the disclosed system parses through a document with dynamic content tags, it will recognize the dependency between the profile name field and the ssid field. Thus, the disclosed system will not prompt the user to input the value for profile name field, it will prompt the user for value of the ssid field instead.

The dynamic content tags supported by the disclosed system include, but are not limited to, grouping, optional line, if-condition block, non-configuration variable, hook, snippet, default, group order, device, etc. Next, the disclosed system generates static configuration file corresponding to one or more devices for the user based on the user input values.

(1) Grouping

Grouping tags (e.g., "begingroup," "endgroup," etc) are generally used to group relevant configuration together for presentation purposes. Although the configuration in a particular group may not be directly adjacent to each other, an end-user will see the relevant configuration grouped together as if it was adjacent. Additional options available to the grouping tag include, but are not limited to, "title," "description," "order," etc. In particular, the title option can indicate the name of the group; the description option can describe the tasks for the group; the order option may control the ordering of the group; etc.

The following example illustrates how the grouping tag can be used to display the creation of a WLAN and the creation of an AP-Group in one logical group even though there may be other configurations, such as "<other config>," between them.

```
{{ begingroup title="SSID" description="Create SSID" order="0" }}
    wlan ssid-profile "tpl-%profile_name%"
        essid "%essid%"
    exit
{{endgroup}}
<other config>
{{ begingroup title="SSID" description="Create SSID" order="0" }}
    ap-group "tpl-%profile_name%"
        virtual-ap "tpl-%profile_name%"
    exit
{{endgroup}}
```

(2) Group Order

The group order tag is generally used to control the order that each group is presented to the user. By specifying an order for each group, the disclosed system can adjust the sequence of questions in which the user is prompted.

The following example illustrates how, with the use of group order, a user may be presented with the SSID group before the ACL group even though the resulting configuration will be in a different order, e.g., ACL configuration followed by SSID configuration.

```
{{ begingroup title="ACL" description="Create ACL" order="1" }}
<ACL Configuration>
{{endgroup}}
{{ begingroup title="SSID" description="Create SSID" order="0"
}}
<SSID Configuration>
{{endgroup}}
```

(3) Optional Line

The optional line tag is generally used to conditionally hide or display a single configuration line. The options to the OptionalLine tag include condition, which can be used to specify the criteria that must be evaluated to be true in order to display the configuration line.

The following example illustrates how the optionalline tag is used to set the auth-server to "internal" only if the user has not selected the RADIUS server field to be "external."

```
auth-server "Internal" {{ optionalline
   condition="field_radius_internal_or_external.val( )!='external'"
}}
```

(4) If-Condition Block

The if-condition block is generally used to conditionally hide or display multiple configuration lines. Similar to OptionalLine, the if-condition block can be attached with options such as a condition, which may specify the criteria that must evaluate to true in order to display all configuration lines inside the if-conditional block.

In the following example, if the user has selected the RADIUS server to be "external", then the disclosed system enables both the RADIUS accounting server and the RFC-3576 server. However, if the user has not selected the RADIUS server to be "external", the disclosed system will hide all configuration lines inside the if-condition block.

```
{{ beginif
   condition="field_radius_internal_or_external.val( )=='external'"
}}
   radius-accounting "%gen_prefix%-%profile_name%"
   rfc-3576-server "%radius_server_host%"
{{ endif }}
```

(5) Non-Configuration Variable

A non-configuration variable is generally used to either (a) adjust the sequence of the questions to the user, or (b) ask a question from the user that doesn't directly correspond to a line in the configuration. The non-configuration variables can be attached with options such as name, which indicates the name of the non-configuration variable.

The following example illustrates how the non-configuration variable is used to adjust the sequence of questions to the user. Without the {{nonconfigvar opmode2}}, the sequence of questions asked to the user would be essid, wpa_passphrase, and then opmode2. The nonconfigvar allows the question corresponding to opmode2 to be asked earlier than the later question (e.g., wpa_passphrase). Thus, the new sequence of questions is essid, opmode2, and then wpa_passphrase. This sequence is more natural for the end-user. Note that, the sequence in the configuration is unchanged. Only the sequence presented to the user is changed by the nonconfigvar tag.

```
wlan ssid-profile "ssid-profile"
   essid "%essid%"{{ nonconfigvar opmode2 }}
   wpa-passphrase "%wpa_passphrase%" {{ optionalline
      condition="field_opmode2.val( )=='wpa-psk-aes' ||
      field_opmode2.val( )=='wpa-psk-tkip' ||
      field_opmode2.val( )=='wpa2-psk-aes' ||
      field_opmode2.val( )=='wpa2-psk-tkip'" }}
   opmode %opmode2%
exit
```

The following example illustrates how nonconfigvar tag can be used to display a question for a user regarding whether the user wants to configure the RADIUS server to be internally or externally hosted. The answer to the question will not directly update the configuration, but will instead spawn additional questions to the end-user using if-condition blocks and/or optional lines.

{{nonconfigvar radius_internal_or_external}}

(6) Hook

The hook tag is generally used to automatically generate a dynamic configuration based on the value(s) of one or more fields. The hook tag may be attached with options, such as <hook name> and/or hook_to. Specifically, the <hook name> indicates the name of a referenced hook object that contains the logic to evaluate. Moreover, the hook_to can be used to bind the hook to a particular variable, so that the hook re-evaluates immediately after the target variable changes.

For example, when the VLAN Pool field is modified by the user, the "create_each_vlan" hook is evaluated. The evaluation result will be a set of configuration that will be automatically inserted where the hook tag exists. In this example, a user can enter a comma separated list of VLANs or VLAN ranges, such as "1, 3, 6-9." Accordingly, the disclosed system will create configuration lines that generate the 6 VLANs corresponding to VLAN1, VLAN3, VLAN6, VLAN7, VLAN8, and VLAN9.

{{hook create_each_vlan hook_to="vlan_pool"}}

(7) Snippet

The snippet tag is generally used for reference to a set of configuration that has been created previously. The configuration retrieved by the snippet replaces the snippet tag. Snippets allow a set of configuration to be re-used by multiple solutions. The snippet tag may be followed by options, such as name, is_group, order, etc. Specifically, "name" indicates the name of the snippet. "is_group" converts the snippet to a group as if the snippet had grouping tags, such as {{begingroup}} and {{endgroup}} tags, around it. The "order" option gives the ability to set a group order if is_group is specified.

The following example illustrates how the disclosed system can pull in the configuration from a snippet called "aruba_ssid_dot1x_part1," and set it to be a group with a specific ordered placement.

{{snippet aruba_ssid_dot1x_part1 is_group order=1}}

(8) Defaults

The defaults tag is generally used to offer a user a set of pre-defined values that the user can optionally select for one particular configuration. Furthermore the defaults tag can be followed by options, such as title, <variable>=<value> pair, etc. Specifically, the title option indicates a name for the set of default values. Moreover, the <variable>=<value> pair indicates a set of key-value pairs to map the variable names to their values.

The following example provides two sets of defaults that a user can select. The first set of defaults is designed for an exemplary "Onboard" configuration; and, the second set of defaults is designed for an exemplary "Captive Portal" configuration.

```
{{ defaults title="Onboard Configuration" essid="onboard-
secure" vlan_id="800" vlan_ip="192.168.100.1"
vlan_netmask="255.255.255.0" }}
{{ defaults title="Captive Portal Configuration"
essid="captive-portal" vlan_id="900" vlan_ip="192.168.200.1"
vlan_netmask="255.255.255.0" }}
```

(9) Device

The device tag is used to separate the configuration between different devices that a solution targets. Field values may be shared between multiple devices, so that a user does not have to repeatedly answer the same question for each device. The device tag may be followed by option such as name, which can be used to indicate the name of the device.

The following example, the device tag is used to separate the configuration between two devices, for example, an Instant Access Point® (IAP) and a Mobility Access Switch.

```
{{ begindevice name="Instant AP" }}
<Instant AP configuration>
{{enddevice}}
{{ begindevice name="Mobility Access Switch" }}
<Mobility Access Switch configuration>
{{enddevice}}
```

Processes for Automatic Generation of Forms for Device Configuration

Figure 4:
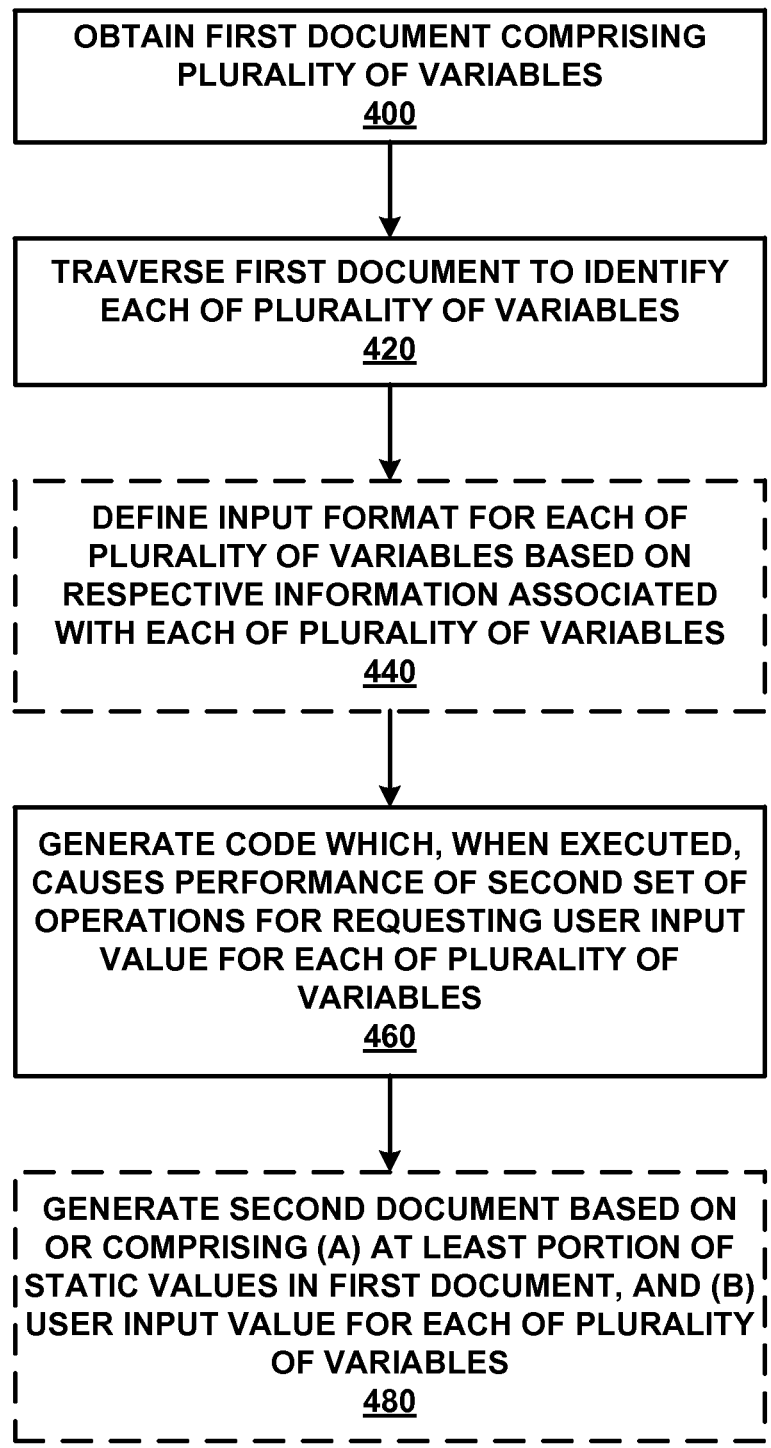
FIG. 4 shows a flowchart for an exemplary process for automatic generation of forms for device configurations according to embodiments of the present disclosure.

FIG. 4 shows a flowchart for an exemplary process for automatic generation of forms for device configurations according to embodiments of the present disclosure. During operations, the disclosed system obtains a first document comprising a plurality of variables (operation 400). Also, the disclosed system traverses the first document to identify each of the plurality of variables (operation 420). The disclosed system can optionally define an input format for each of the plurality of variables based on respective information associated with each of the plurality of variables (operation 440). The disclosed system then generates code which, when executed, causes performance of a second set of operations for requesting a user input value for each of the plurality of variables (operation 460).

In some embodiments, the first document includes two occurrences of a first variable. Nonetheless, the generated code requests a first user input value for the first variable, and uses the same first user input value as a value for each occurrence of the first variable.

In some embodiments, the first document includes another variable separate from the plurality of variables. The other variable may be a derived variable from one or more of the plurality of variables that the user is prompted to enter the values for. The disclosed system also generates a second document based on (a) at least a portion of the static values in the first document and (b) the user input value for each of the plurality of variables. The second document includes a device configuration for a respective device (operation 480).

In some embodiments, the disclosed system generates a second document comprising (a) at least a portion of the static values in the first document and (b) the user input value for each of the plurality of variables (operation 480). The second document comprises a device configuration for a particular device. Also, the second document may be generated based on one of a plurality of templates, the template being selected based on a particular device. Note that, the second document can be generated with default values based on the user input value for each of the plurality of variables.

In some embodiments, the code generates a Graphical User Interface (GUI) to request the user input value for each of the plurality of variables.

In some embodiments, the disclosed system requests the user input value for the plurality of variables by dynamically selecting variables for requesting user input values based on received user input values. Furthermore, the disclosed system may request a particular user input value for a particular variable not in the first document. Also, the disclosed system may request a particular user input value for a particular variable, which is selected based on evaluation of a condition. Moreover, the disclosed system may select an order of the plurality of variables for requesting user input values based on an order of a first occurrence of each of the plurality of variables, while requesting the user input value for each of the plurality of variable. Specifically, the disclosed system can select an order of the plurality of variables for requesting user input values based on an indication of the order in the first document.

Figure 5:
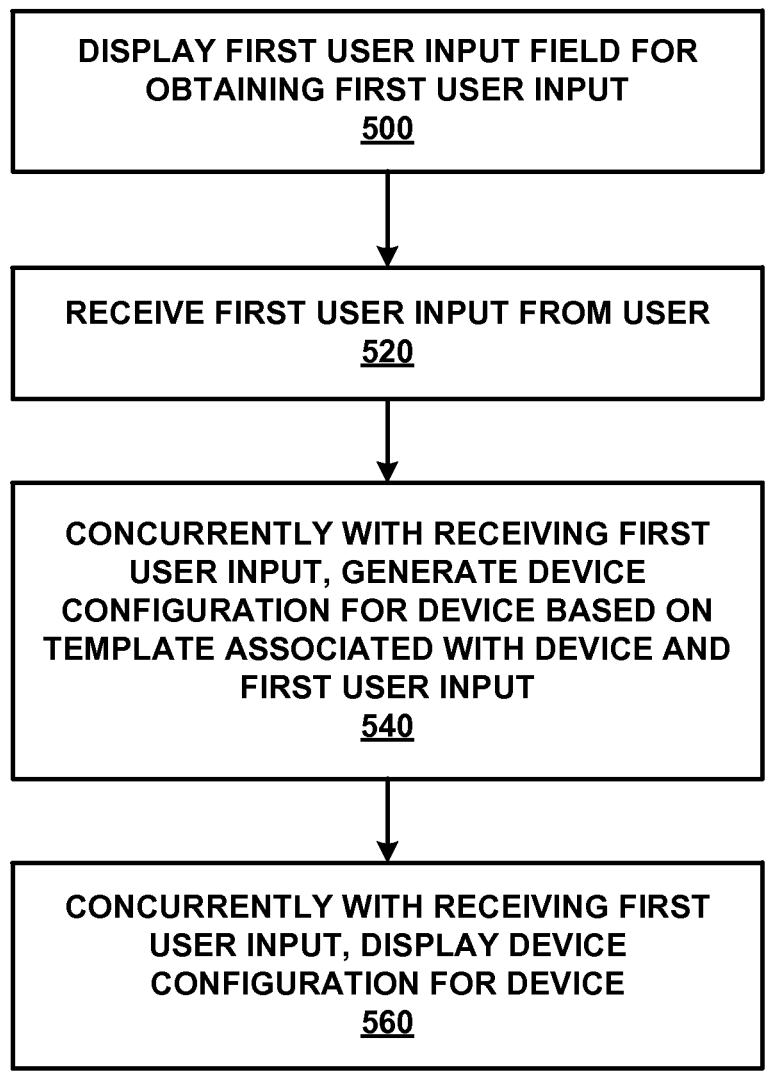
FIG. 5 shows a flowchart for another exemplary process for automatic generation of forms for device configurations according to embodiments of the present disclosure.

FIG. 5 shows a flowchart for another exemplary process for automatic generation of forms for device configurations according to embodiments of the present disclosure. During operations, the disclosed system displays a first user input field for obtaining a first user input (operation 500), and receives the first user input from the user (operation 520). Concurrently with receiving the first user input from the user, the disclosed system generates a device configuration for a device based on a template associated with the device and the first user input (operation 540), and displays the device configuration for the device (operation 560). Specifically, displaying the device configuration comprises displaying the first user input in a GUI interface for configuring the device. Note that, the user input field and the device configuration can be concurrently displayed on a same screen. Also, the device configuration comprises a Command Line Interface (CLI) command.

System for Automatic Generation of Forms for Device Configuration

Figure 6:
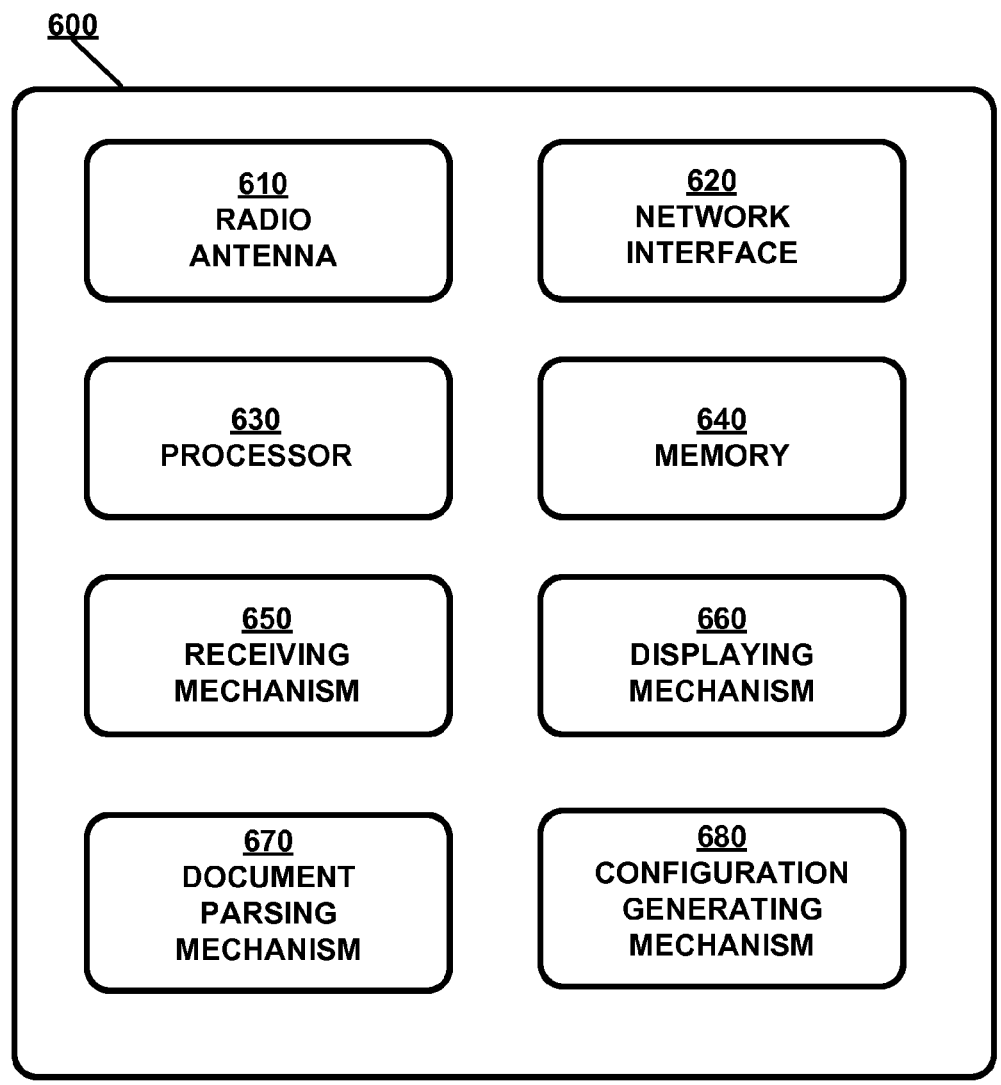
FIG. 6 is a block diagram illustrating a system for automatic generation of forms for device configurations according to embodiments of the present disclosure.

FIG. 6 is a block diagram illustrating a system for automatic generation of forms for device configurations according to embodiments of the present disclosure.

Device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a displaying mechanism 660, a document parsing mechanism 670, and a configuration generating mechanism 680, all of which are in communication with processor 630 and/or memory 640 in device 600. Device 600 may be used as a client system, or a server system, or may serve both as a client and a server in a distributed or a cloud computing environment.

Radio antenna 610 is an optional component, and may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more user input values from a user through a user interface. Also, receiving mechanism 650 may receive network device configuration documents from network users. Receiving mechanism 650 may also receive network messages that may include, but are not limited to, requests and/or responses, beacon frames, management frames, control path frames, and so on.

Displaying mechanism 660 generally displays an interface to a user for requesting a user input value. Specifically, displaying mechanism 660 may displaying a form for requesting a user input value for each of a plurality of variables based on code generated by document parsing mechanism 670.

Displaying mechanism 660 may request the user input value for each of the plurality of variables. Specifically, displaying mechanism 660 can dynamically select variables for requesting user input values based on received user input values.

In some embodiments, displaying mechanism 660 may request a particular user input value for a particular variable not in the first document. In some embodiments, displaying mechanism requests a particular user input value for a particular variable, which is selected based on evaluation of a condition. Displaying mechanism 660 can also select an order of the plurality of variables for requesting user input values based on an order of a first occurrence of each of the plurality of variables. The selection of order of the plurality of variables for requesting user input values can be based on an indication of the order in the first document.

In some embodiments, displaying mechanism 660 can display the device configuration for the device concurrently with receiving the first user input from the user. Moreover, the user input field and the device configuration can be concurrently displayed on a same screen. Furthermore, while displaying the device configuration, displaying mechanism 660 can display the first user input in a GUI interface for configuring the device.

Document parsing mechanism 670 generally traverses a document to identify a plurality of variables. Furthermore, document parsing mechanism 670 can generate code which, when executed, causes performance of a second set of operations for displaying mechanism 660 to request a user input value for each of the plurality of variables.

Document parsing mechanism 670 can further define an input format for each of the plurality of variables based on respective information associated with each of the plurality of variables.

In some embodiments, the document comprises two occurrences of a first variable. The generated code allows displaying mechanism 660 to request a first user input value for the first variable, and document parsing mechanism 670 uses the same first user input value as a value for each occurrence of the first variable. Note that, the document may also comprise another variable separate from the plurality of variables, such as a derived variable. In some embodiment, the generated code can generate a Graphical User Interface (GUI) to request the user input value for each of the plurality of variables.

Configuration generating mechanism 680 generally generates a document based on (a) at least a portion of the static values in the first document and (b) the user input value for each of the plurality of variables. The generated document comprises a device configuration for a particular device. The device configuration comprises a Command Line Interface (CLI) command. Moreover, the document can be generated based on one of a plurality of templates, which is selected based on a particular device.

In some embodiments, configuration generating mechanism 680 generates a document with default values based on the user input value for each of the plurality of variables.

In some embodiments, configuration generating mechanism 680 generating a device configuration for a device based on a template associated with the device and the first user input concurrently with receiving mechanism 650 receiving a user input from a user.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, cause the one or more hardware processors to:
   obtain a first configuration file document comprising a plurality of variables to configure a network device;
   traverse the first configuration file document to identify each of the plurality of variables;
   separate a static content portion and a dynamic content portion within the plurality of variables by defining a set of working command line interface configurations;
   parameterize the dynamic content portion in one configuration of the set of working command line interface configurations using a template language;
   generate question prompts requesting a user input value for each of the plurality of variables based on the separation and parameterization; and
   in response to receipt of the user input value for each of the plurality of variables, update the first configuration file document in real time and configure the network device in real time; and
   display, via a graphical user interface, the updated first configuration file and the question prompts in a same window view.

2. The non-transitory computer readable medium of claim 1, wherein the instructions further cause the one or more hardware processors to define an input format for each of the plurality of variables based on respective information associated with each of the plurality of variables.

3. The non-transitory computer readable medium of claim 1, wherein the first configuration file document comprises two occurrences of a first variable, and wherein one of the question prompts requests a first user input value for the first variable and uses the same first user input value as a value for each occurrence of the first variable.

4. The non-transitory computer readable medium of claim 1, wherein the first configuration file document comprises another variable separate from the plurality of variables.

5. The non-transitory computer readable medium of claim 1, wherein the each of the question prompts is a graphical user interface to request the user input value for each of the plurality of variables.

6. The non-transitory computer readable medium of claim 1, wherein the instructions cause the one or more hardware processors to update the first configuration file document based on (a) a portion of static values in the first configuration file document and (b) the user input value for each of the plurality of variables.

7. The non-transitory computer readable medium of claim 1, wherein the first configuration file document comprises the static content portion comprising static values and the dynamic content portion including the plurality of variables.

8. The non-transitory computer readable medium of claim 7, wherein the first configuration file document comprises a device configuration for a particular device.

9. The non-transitory computer readable medium of claim 8, wherein the first configuration file document is generated based on one of a plurality of templates, the template being selected based on the particular device.

10. The non-transitory computer readable medium of claim 1, wherein the instructions cause the one or more hardware processors to update the first configuration file document with default values based on the user input value for each of the plurality of variables.

11. The non-transitory computer readable medium of claim 1, wherein to generate the question prompts requesting the user input value for each of the plurality of variables, the instructions cause the one or more hardware processors to dynamically select variables for requesting user input values based on received user input values.

12. The non-transitory computer readable medium of claim 1, wherein the question prompts request a particular user input value for a particular variable not in the first configuration file document.

13. The non-transitory computer readable medium of claim 1, wherein the question prompts request a particular user input value for a particular variable, the particular variable being selected based on evaluation of a condition.

14. The non-transitory computer readable medium of claim 1, wherein to request the user input value for each of the plurality of variable, the instructions cause the one or more hardware processors to select an order of the plurality of variables for requesting user input values based on an order of a first occurrence of each of the plurality of variables.

15. The non-transitory computer readable medium of claim 1, wherein to request the user input value for each of the plurality of variable, the instructions cause the one or more hardware processors to select an order of the plurality of variables for requesting user input values based on an indication of the order in the first configuration file document.

16. A non-transitory computer readable medium comprising instructions which, when executed by one or more hardware processors, cause the one or more hardware processors to:
   traverse a configuration file document to identify a plurality of variables;
   separate a static content portion and a dynamic content portion within the plurality of variables by defining a set of working command line interface configurations;
   parameterize the dynamic content portion in a configuration of the set of working command line interface configurations using a template language;
   display a first user input field for obtaining a first user input for one of the plurality of variables based on the separation and parameterization;
   receive the first user input from the user;
   concurrently with receiving the first user input from the user:
      generate in real time a device configuration for the network device based on a template associated with the network device and the first user input; and
      display in real time and via a graphical user interface, the device configuration for the network device, wherein the first user input field and the device configuration are concurrently displayed on a same screen.

17. The non-transitory computer readable medium of claim 16, wherein the device configuration comprises a command line interface command.

18. The non-transitory computer readable medium of claim 16, wherein the display of the device configuration comprises a display of the first user input in a graphical user interface interface for configuring the network device.

19. A system comprising:
   a hardware processor; and
   a memory storing instructions that, when executed by the hardware processor, cause the hardware processor to:
      obtain a first configuration file document comprising a plurality of variables to configure a network device;
      traverse the first configuration file document to identify each of the plurality of variables;
      separate a static content portion and a dynamic content portion within the plurality of variables by defining a set of working command line interface configurations;
      parameterize the dynamic content portion in a configuration of the set of working command line interface configurations using a template language;
      generate question prompts requesting a user input value for each of the plurality of variables based on the separation and parameterization; and
      in response to receipt of the user input value for each of the plurality of variables, update the first configuration file document in real time and configure the network device in real time; and
      display, via a graphical user interface, the updated first configuration file and the question prompts in a same window view.

20. The system of claim 19, wherein the instructions are executable to provide a device-independent syntax for generating device-dependent and vendor-specific configurations.

* * * * *